(12) United States Patent
Chandrasekaran et al.

(10) Patent No.: US 12,715,308 B2
(45) Date of Patent: Aug. 25, 2026

(54) SYSTEMS AND METHODS FOR MANAGING AN ENERGY STORAGE SYSTEM

(71) Applicant: Transportation IP Holdings, LLC, Norwalk, CT (US)

(72) Inventors: Shankar Chandrasekaran, Erie, PA (US); Satendra Kumar Singh, Bangalore (IN); David Petersen, Erie, PA (US); Jason Quigley, Erie, PA (US); Jayaprakash Sabarad, Bangalore (IN); Sunkara Prasanth, Bangalore (IN); Rajeev Verma, Bangalore (IN); Vinay Bavdekar, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 230 days.

(21) Appl. No.: 18/482,369

(22) Filed: Oct. 6, 2023

(65) Prior Publication Data

US 2024/0157812 A1 May 16, 2024

Related U.S. Application Data

(60) Provisional application No. 63/425,923, filed on Nov. 16, 2022.

(51) Int. Cl.

| | |
|---|---|
| ***B60L 15/20*** | (2006.01) |
| ***B60W 10/08*** | (2006.01) |
| ***B60W 10/26*** | (2006.01) |

(52) U.S. Cl.

CPC ......... *B60L 15/2045* (2013.01); *B60W 10/08* (2013.01); *B60W 10/26* (2013.01); *B60L 2200/26* (2013.01)

(58) Field of Classification Search

None

See application file for complete search history.

(56) References Cited

U.S. PATENT DOCUMENTS

| | | | | |
|---|---|---|---|---|
| 4,536,126 | A | 8/1985 | Reuther | |
| 7,893,658 | B2 | 2/2011 | Bhardwaj | |
| 8,381,658 | B1 | 2/2013 | Miller et al. | |
| 8,548,715 | B2 | 10/2013 | Gallagher et al. | |
| 9,475,391 | B2 | 10/2016 | Goodermuth et al. | |
| 2012/0143407 | A1 | 6/2012 | Murthy | |
| 2013/0054060 | A1* | 2/2013 | Dupuy | F02N 11/0825 180/65.28 |
| 2019/0081369 | A1* | 3/2019 | Monden | H01M 10/48 |
| 2021/0086800 | A1 | 3/2021 | Swenson et al. | |
| 2021/0278470 | A1* | 9/2021 | Cyrne | G01R 31/371 |
| 2022/0200311 | A1* | 6/2022 | Oonishi | H02J 7/342 |

* cited by examiner

*Primary Examiner* — James J Lee
*Assistant Examiner* — Jonathan E Reinert
(74) *Attorney, Agent, or Firm* — K&L Gates LLP

(57) ABSTRACT

A system is provided that may include one or more processors that may receive one or more signals relating to operation of an energy system of a vehicle. The processors may calculate an operational status of the energy storage system based at least in part on comparing the one or more signals with one or more designated criteria related to the energy storage system. The processors may automatically control a shutdown and a startup of an engine of the vehicle responsive to the operational status of the energy storage system being below a threshold.

16 Claims, 9 Drawing Sheets

600

SYSTEMS AND METHODS FOR MANAGING AN ENERGY STORAGE SYSTEM

CROSS-REFERENCE TO RELATED APPLICATIONS

This application claims priority to U.S. Provisional Application No. 63/425,923, filed on Nov. 16, 2022, the entire disclosure of which is incorporated herein by reference.

BACKGROUND

Technical Field

The present disclosure relates generally to monitoring and evaluating energy storage systems, specifically energy storage systems on vehicles.

Discussion of Art

Vehicles may have a variety of components or tasks that require energy input, such as a propulsion system, engine cranking, engine power, traction motors, control systems, lights, and the like. The energy inputs may be provided by an energy storage device or system, such as a battery system. It may be useful to monitor operation of the energy storage system to prevent, reduce, or predict failure or undesirable operation of the energy storage system.

To conserve fuel and reduce emissions, vehicles may be equipped with systems for automatically starting and stopping engines when one or more conditions exist. These systems may include automatic engine start stop (AESS) systems. While these systems may be effective, vehicle operators may take steps to prevent the AESS system from engaging, for example, to provide heating and air conditioning to the operator cabin or to maintain a certain pressure in the air brake system, as current vehicle energy storage systems, such as batteries, may have insufficient capacity to adequately power such loads. In addition, vehicles may be equipped with lower-power devices such as telematics that allow communication between the vehicle and a back office, lights, sensors and cameras. It may be desirable to provide power to those lower-power devices even when the vehicle engine is not running.

One area where energy input may be significant is in the cranking to start the vehicle. If the energy storage device does not have sufficient capacity to crank the engine, the vehicle will not start. This may be known as “dead, won’t start” (DWS).

It may be desirable to have a system and method that differs from those that are currently available.

BRIEF DESCRIPTION

In accordance with one example or aspect, a system is provided that may include one or more processors that may receive one or more signals relating to operation of an energy storage system of a vehicle. The one or more processors may calculate an operational status of the energy storage system based at least in part on comparing the one or more signals with one or more designated criteria related to the energy storage system. The one or more processors may automatically control a shutdown and a startup of an engine of the vehicle responsive to the operational status of the energy storage system being below a predetermined threshold.

In accordance with one example or aspect, a method is provided that includes obtaining measurements of electrical output of an energy storage system onboard a vehicle responsive to expiration of a predetermined amount time following shutdown of an engine of the vehicle. The method may include comparing the measurements of the electrical output of the energy storage system with a functional output threshold of the energy storage system. The method also may include calculating an operational status of the energy storage system based on a difference between the measurements of the electrical output of the energy storage system and the functional output threshold of the energy storage system.

In accordance with one example or aspect, a system is provided that may include one or more processors that may receive one or more signals relating to an electrical output of an energy storage system onboard a vehicle. The one or more signals may be received responsive to expiration of a predetermined amount of time following a shutdown of an engine of the vehicle. The one or more processors may compare the electrical output of the energy storage system with a functional output threshold of the energy storage system. The one or more processors may automatically control the shutdown and a startup of the engine of the vehicle responsive to the one or more signals meeting one or more designated criteria relative to the functional output threshold of the energy storage system. The one or more processors may calculate an operational status of the energy storage system of the vehicle based on the one or more signals. The one or more designated criteria for the control of the shutdown and the startup of the engine may relate to the operational status that is calculated.

BRIEF DESCRIPTION OF THE DRAWINGS

The subject matter may be understood from reading the following description of non-limiting embodiments, with reference to the attached drawings, wherein below.

DETAILED DESCRIPTION

Figure 1:
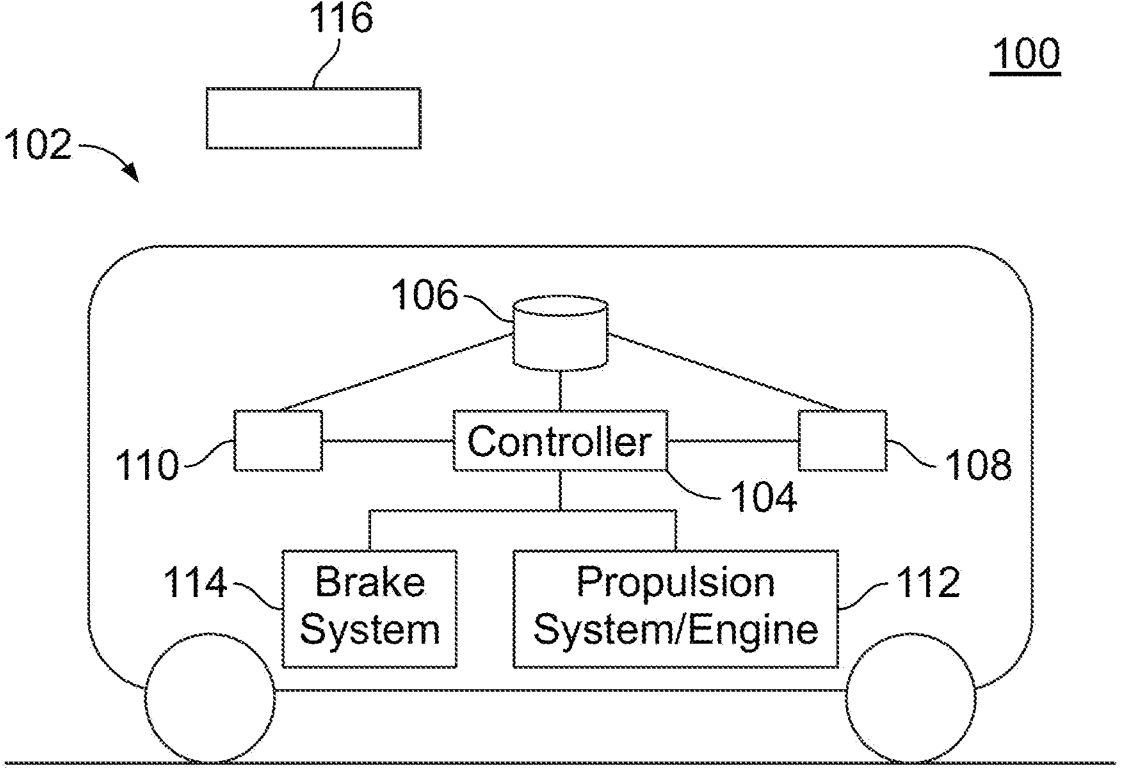
FIG. 1 shows an energy storage management and monitoring system, according to one example.

Embodiments of the subject matter described herein relate to monitoring and evaluating the operational status of an energy storage system, such as energy storage systems on vehicles. It may be useful to monitor operation of the energy storage systems, otherwise failure, decreased operation, or other undesirable operation of the energy storage system may lead to mission failures, road failures, failures to start, accidents, or the like. For rail vehicles, the average rate for energy storage systems registering a DWS reading may be around 0.2%. Of this 0.2%, about 50% of cases may be related to weak or dead batteries based on a state of charge, around 25% may be attributed to improper shutdown, and the remaining 25% may be due to DWS readings based on an overall operational status of the energy storage system.

Energy storage systems, such as batteries, may be used as a power source for vehicles. Batteries may be used on a vehicle to power engine cranking, control systems, lights onboard the vehicle or headlights of the vehicle, propulsion systems, communication systems, such as radio propagation systems (RPS), among other systems.

Currently, there may be options for improving the functional life of energy storage systems and preventing DWS, such as battery saver modes, load shed, and ultracapacitors. These options, however, may have various downsides, such as added weight, cost, and complexity to the vehicle and system. Despite these offerings, there is still the 0.2% failure rate of energy storage systems. If the battery health and/or capacity is below a predetermined threshold, the battery may not have the required energy to crank the engine to start the vehicle. Dead energy storage systems may require a jump start and the corresponding delay may result in significant cost and inconvenience to the customer. However, if the operational status of the battery is determined onboard, the vehicle may be prevented from shutting down when the battery capacity may be below the predetermined threshold. By preventing shut down, the vehicle may be able to travel to a service location for maintenance to prevent a situation where the vehicle shuts down, and the battery may not have sufficient capacity to crank the engine to start the vehicle.

Previous systems may have evaluated a state of charge of the energy storage system to predict potential failures. However, by evaluating more and/or other factors to determine an overall operational status or a state of health of the energy storage system, the predictive accuracy may be improved and thus energy storage system-related failures may be reduced.

The subject matter described herein may address the above issues using one or more of multiple strategies. One strategy may involve identifying weak or dead energy storage systems, such as batteries. The resistance of the battery electrical series may be measured during several cranking events using a controller on the vehicle. In one example, the resistance measured onboard may be repeatedly measured at different times and the measurements may be evaluated to determine a trend of the resistances. This trend may be used to determine the operational status of the energy storage system. In one example, the controller may calculate one or more of a mean, minimum, maximum, or standard deviation of the resistance to determine the operational status of the battery. The measured resistance may be examined in conjunction with the number of crankings, deep discharges, temperature, and/or age of the battery (among other factors) to provide an indication of the operational status of the battery.

The determined operational status may indicate degradation of the battery. The measured resistance of the battery during cranking may be further improved by measuring charge transfer resistance to predict an operational status of the battery. Additionally, resistance or impedance of the battery may periodically be monitored at a service shop, to compare to the onboard reading. The resistance or impedance measured at the service shop may then be used to modify or correct for inadequacies in data processing capabilities on the controller on the vehicle. As the standard deviation of this resistance increases, the operational status of the energy storage device may correspondingly decrease. Conversely, as the standard deviation of this resistance decreases, the operational status of the energy storage device may correspondingly increase.

While one or more embodiments are described in connection with a rail vehicle or a rail vehicle system, other embodiments may relate to other types of vehicles. Unless expressly disclaimed or stated otherwise, the subject matter described herein extends to other types of vehicles and vehicle systems, such as automobiles, trucks (with or without trailers), buses, marine vessels, aircraft, unmanned aircraft (e.g., drones), mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, the vehicles may be logically but not mechanically coupled when the separate vehicles communicate with each other to coordinate movements of the vehicles with each other so that the vehicles travel together (e.g., as a convoy).

FIG. 1 illustrates one example of an energy storage management and monitoring system 100. The monitoring system may be disposed onboard a vehicle 102 and may include a controller 104, an energy storage system 106, one or more sensors 108, 110, 116, a brake system 114 and a propulsion system 112, which may include an engine or another device capable of performing work to propel the vehicle. The controller may receive one or more outputs or signals from the one or more sensors relating to operation of the vehicle and/or the energy storage system. The signals relating to operation of the vehicle and/or the energy storage system may include a capacity of the energy storage system, a voltage of the energy storage system, a temperature of the energy storage system, an age of the energy storage system, a speed of the vehicle, a location of the vehicle, or the like. The capacity of the energy storage system may be a remaining capacity of the energy storage system, a total capacity of the energy storage system in a full or fully charged state, an expected capacity of the energy storage system at a given time, or the like. The voltage of the energy storage system may be the amount of electrical potential the energy storage system may hold and may be used to determine a state of charge of the energy storage system. The signals may be used to determine an overall operational status of the energy storage system, discussed further below.

The propulsion system of the vehicle may include traction motors. Certain vehicles (e.g., locomotives) and other off-highway vehicles may be powered by electric traction motors coupled in driving relationship to one or more axles of the vehicle. In a motoring mode of operation, the traction motors may be supplied with electric current from a controllable source of electric power such as an engine-driven traction alternator. The traction motors may apply torque to the vehicle wheels, which in turn may exert tangential force (tractive effort) on the surface on which the vehicle is traveling, e.g., the parallel steel rails of a railroad track, and thereby propel the vehicle in a desired direction along a route of travel. In another instance, in a dynamic braking mode of operation, the motors may serve as axle-driven electrical generators. In this mode of operation, the traction motors may exert torque in an opposite direction from the rolling direction of the wheels, thereby slowing the vehicle's motion.

The energy storage device management and monitoring system may include a single controller or multiple controllers. The controller(s) may include one or more processors, microprocessors, microcontrollers, or other logic devices that operate based on instructions stored on a tangible and non-transitory computer readable storage medium, such as software applications stored on a memory. If a system, apparatus, assembly, device, etc. (e.g., a controller, control device, control unit, etc.) includes multiple processors, these processors may be located in the same housing or enclosure (e.g., in the same device) or may be distributed among or between two or more housings or enclosures (e.g., in different devices). The multiple processors in the same or different devices may each perform the same functions described herein, or the multiple processors in the same or different devices may share performance of the functions described herein. For example, different processors may perform different sets or groups of the functions described herein.

As used herein, energy storage system may include one or more of a battery, a capacitor, a fuel cell, a flywheel, or the like.

The sensors may include onboard sensors and/or offboard sensors. The sensors may include electrical sensors that may measure operational parameters related to the vehicle, the energy storage system, or the like. The sensors may include an ohmmeter measuring electrical resistance of the energy storage system, a voltmeter measuring electrical potential in volts of the energy storage system, an impedance analyzer measuring impedance of the energy storage system, an ammeter measuring current of the energy storage system, a multimeter measuring a voltage and a current produced by a battery cell of the energy storage system, a temperature sensor measuring a temperature of the energy storage system (e.g., thermocouples, thermometer, etc.), or the like.

The sensors may be positioned onboard or offboard the vehicle and may measure or read signals relating to operational characteristics of the vehicle, specifically, the energy storage system. The measurements or readings may occur during the startup of the vehicle or cranking of the engine, during the shutdown of the vehicle, during travel of the vehicle, during a period where the vehicle may not be moving, or the like. The sensors may take one or more measurements during an operating session of the vehicle. As used herein, an operating session may be a time in which the vehicle may be in use, may be using the propulsion system to move the vehicle, may be using energy from the energy storage system, or the like.

The controller may compare the one or more measurements or readings from one or more sensors with each other, as well as with the designated criteria. These operational characteristics may provide a holistic view of the current and potential future operation of the energy storage system and/or the vehicle. A monitoring system that uses the reading from only one sensor, for example a voltmeter measuring electrical potential of the energy storage system, may be able to provide a current operational condition of the energy storage system. However, where the monitoring system uses readings from multiple sensors and may be able to use the multiple measurements and readings for diagnostic purposes, the monitoring system may be able to more accurately diagnose and forecast the current and future operational states of the energy storage system and/or the vehicle.

The one or more sensors may output the one or more signals to the controller. In response to receiving the signals relating to operation of the energy storage device, the controller may compare the signals to one or more designated criteria. The designated criteria may include a baseline reading for a fully operational or functional energy storage system. The designated criteria may be related to the measurements of the one or more sensors. For example, the designated criteria may be a baseline voltage, current, impedance, or the like of an operational energy storage system, while the one or more sensors may measure the same in the energy storage system of a given vehicle.

The controller may calculate or determine the operational status or a state of health (SOH) of the energy storage system. The operational status may be an operational state of the energy storage system, for example a level of degradation (or lack thereof) of the energy storage device. The operational status may provide an estimation of the longevity, efficiency, and performance of the energy storage system. The operational status may be calculated based on a number of inputs from the one or more sensors, operators, crew members, or the like. The inputs may include a number of times the energy storage system has started or cranked the engine, an impedance of the energy storage system, a voltage of the energy storage system, a number of complete discharges of the energy storage system, an age of the energy storage system, and/or a temperature of the energy storage system, among other factors. The operational status may also be calculated based on a measurement of a charge transfer resistance of the energy storage system, which may allow the controller to predict a future operational status of the energy storage system.

The controller may use the designated criteria, such as the baseline reading for a fully operating or functional energy storage system, to compare the measured values to determine the operational status. As used herein, fully operating, fully operational, fully functional, healthy, or the like may be used to describe when the energy storage system may be operating as expected, at full or near-full capacity, above a threshold level of performance in terms of power, capacity, longevity, and duration of charge, or the like.

The controller may calculate or determine the operational status of the energy storage system based at least in part on a difference between the one or more signals with the one or more designated criteria. A predetermined threshold may be calculated by the controller as the difference between the measured signal and the designated criteria. This may provide the gap between the current performance of the energy storage system and the designated criteria, indicating a fully operational energy storage system. Where the difference between the measured signals and the designated criteria may be within a predetermined range, the operational status may be considered to within an operational threshold. The operational threshold may indicate a fully operational energy storage system. The operational status may be determined to be fully operational responsive to the operational status being above the predetermined threshold.

Where the difference between the measured signals and the designated criteria may be outside the predetermined range, the operational status may be considered to be below a predetermined threshold. The operational status may be determined to be in a degraded state responsive to the operational status being below the predetermined threshold. The controller may take a responsive action responsive to the operational status being below the predetermined threshold hold. The responsive action may include may automatically control a shutdown and/or a startup of the engine responsive to the calculated operational status of the energy storage system being below the predetermined threshold. In other examples, the responsive action may include stopping or modifying operation of the vehicle, requesting inspection of the energy storage system, requesting repair of the energy storage system, or the like.

In one example, the controller may receive an input value from the sensor showing an impedance of the energy storage system. The controller may incorporate the input value of the impedance to calculate the operational status of the energy storage system. The controller may compare the input value of the impedance with the designated criteria of impedance determined for an operational energy storage system to calculate the operational status of the energy storage system. The impedance may be used in combination with other measured inputs, such as voltage of the energy storage system, current of the energy storage system, resistance of the energy storage system, age of the energy storage system, temperature of the energy storage system, and the like to determine the operational status of the energy storage system.

In one example, the sensors may measure a voltage and a current in the energy storage system during a charging cycle or a discharging cycle. The sensors may then output the measured voltage and current to the controller. The controller may use the measured voltage and current during charging or discharging to calculate the operational status of the energy storage system. The controller may compare the measured voltage and current with the designated criteria of voltage and current determined for an operational energy storage system to calculate the operational status of the energy storage system.

The controller may monitor a loss in storage capacity of the energy storage system. The storage capacity of the energy storage system may be measured by the sensors, for example a multimeter measuring a voltage and a current of cells of the energy storage system. The controller may monitor the loss in storage capacity by identifying a baseline storage capacity and monitoring the present storage capacity. In one example, the baseline storage capacity may be used as one of the designated criteria. There may be a lower storage threshold that may indicate that the energy storage system may need to be replaced or repaired. The lower storage threshold may be determined based on the lack of capacity of the energy storage system to crank the engine or run the necessary essential and non-essential systems of the vehicle. Once the controller determines that the energy storage system may have reached the lower storage threshold, the controller may modify the operation of the vehicle system. In one example, the controller may prevent shutdown of the vehicle responsive to the lower storage threshold being reached, the controller may reduce the speed of the vehicle responsive to the lower storage threshold being reached, or the like.

Figure 2:
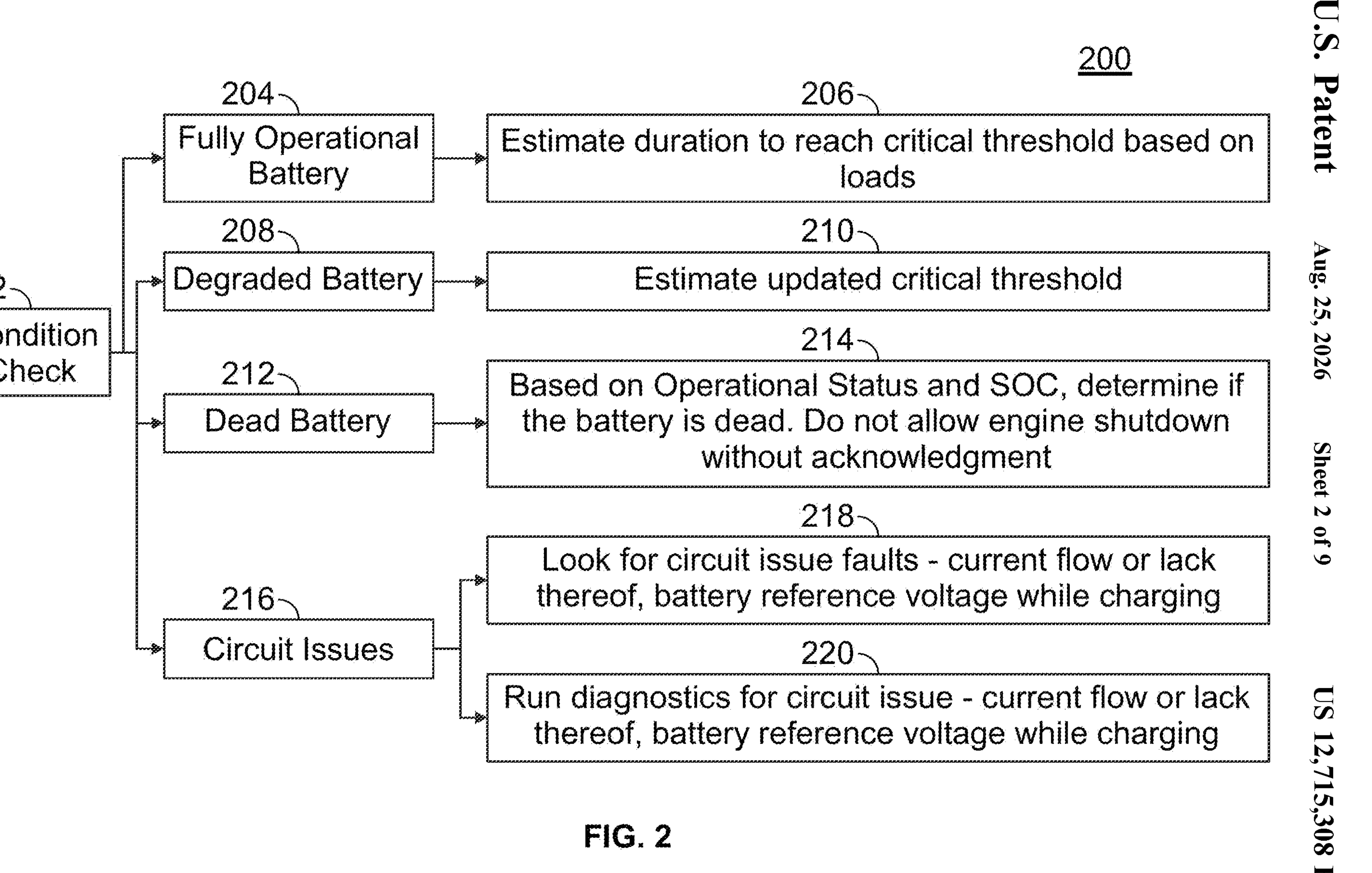
FIG. 2 shows a method of evaluating an energy storage system, according to one example.

FIG. 2 illustrates a method 200 of evaluating a battery system, according to one example. The method may include running a condition check at step 202 on a battery system. The battery system may include one or more batteries and may be referred to interchangeably as the battery or the batteries. The method may involve one or more processors or controllers directing a condition check on the battery system before allowing shutdown of the vehicle. The condition check may test or evaluate various characteristics of the battery system. For example, one or more sensors may measure a voltage, an input or output current, a capacity, a resistance, an impedance, a temperature, or the like of the battery system. The sensors may output the measurements to a controller. The controller may then compare one or more of the outputs to each other or to designated criteria or baseline measurements to determine the operational status of the battery system. While the steps of the method may be shown sequentially, the method may proceed to a different step based on the output or determination made from the condition check about the operational status of the battery system.

At step 204, the method may determine that the battery system may be fully operational. In response to a fully operational battery system, the method may further include step 206 to estimate or otherwise calculate a duration of time to reach a threshold based on the loads required by the battery system. The loads may include power required to crank the engine, operate the propulsion system, operate the brake system, operate control systems, or the like. The threshold may be a threshold below which the battery system, the vehicle, or components of the vehicle may not operate or may operate at diminished capacity. The threshold may be an amount of charge or power remaining in the battery system, below which the battery system may no longer be able to power the required loads. In one example, the threshold may be the amount of battery capacity required to crank or startup the engine. The controller may then estimate a duration of time and use in which the battery system may reach the threshold that may impact function or performance.

At step 208, the method may determine that the battery system may be in a degraded state. The degraded state may indicate the battery system may be in a used, weak, or diminished condition. This determination may be made by the controller based on the outcome of the condition check. This may include the controller receiving the measured outputs from the sensors and comparing the outputs to each other and/or designated criteria (e.g., baseline measurements). A degraded state may be a condition in which the battery system may be non-operational or may be operating in a reduced or diminished state. The degraded state may describe the battery system operating below an expected operation, at a low or lower than average operation, below a threshold level of performance in terms of power, capacity, longevity, and duration of charge, or the like.

Based on the determination that the battery system may be in the degraded state, the method may attempt to take a responsive action or actions to modify or change operation of the vehicle or battery system based on the degraded state of the battery. For example, at step 210 the method may include estimating an updated threshold of the battery system. The updated threshold may provide a more accurate threshold to indicate what the battery system may be capable of in the determined degraded state. For example, the battery system's capabilities may include whether the battery system may be able to power the required loads, and for how long the battery system may be able to power the required loads. In one example, the updated threshold may reflect whether the battery system may have the capacity required to crank or startup the engine, and if so, how many times. The updated threshold may take factor in the diminished capacity of the battery system. Additionally, an alert may be sent notifying an operator of the degraded state of the battery system, as well as the updated threshold. The alert may allow the operator to take responsive action or to plan a trip accordingly, based on the degraded state of the battery system. For example, the operator may schedule maintenance, may slow the speed of the vehicle, may stop the vehicle, may reduce or eliminate non-essential loads, or the like.

At step 212, the method may determine that the battery system may be dead in the current state. The battery system may be non-operational when dead. When the battery system may be non-operational, the battery system may not be able to provide power to the vehicle. Responsive to the battery system being determined to be dead, the method may the proceed to step 214, where the operational status and the state of charge may be re-evaluated to confirm that the battery system may be dead. If the battery system is confirmed to be dead, the engine may not be allowed to shutdown without an acknowledgement by the operator. This may ensure the vehicle does not shutdown in a location where it may be difficult to jump start or otherwise restart the vehicle. For example, the operator may acknowledge the dead state of the battery system and shutdown the vehicle where the vehicle may be stopped at a service station.

At step 216, the condition check may reveal circuit issues with the battery system. The circuit issues may be related to the current, voltage, impedance, resistance, or the like of the battery system. The circuit issues may include overheating of the battery, current flow issue, battery system reference voltage issue while charging, rapid depletion of the battery voltage or charge, inability of the battery to charge, short-circuiting of the battery, inconsistent performance of the battery, or the like. The circuit issues may be identified by the controller based on inputs from one or more sensors.

Responsive to a circuit issue being identified, the method may proceed to step 218. At step 218, the method may include troubleshooting to determine the exact circuit issue or issues. The troubleshooting may include running initial diagnostic tests on the battery system to evaluate and determine where the circuit issue or issues may originate. The troubleshooting may include running various charging cycles, discharging cycles, operating the vehicle, or the like. An alarm may be sent to an operator to inform the operator of the circuit issue(s). The alarm may be visual, auditory, tactile, or the like. The alarm may provide the diagnostic results, the troubleshooting steps taken, circuit issue(s) identified, potential responsive actions to be taken, or the like.

At step 220, the method may include running further diagnostics for the circuit issue(s) and providing an alert based on the diagnostic results. The diagnostic tests may be run at a service shop by a technician or may be run by one or more controllers. The diagnostic tests may include testing a capacity of the battery system by discharging the battery system and determining a current capacity of the battery system. The diagnostic tests may include thermal imaging using imaging technology, for example an infrared camera, to identify hot-spots in the battery. The hot-spots may be associated with short-circuits, battery system overheating, or the like. The thermal imaging may be done during the charging and discharging of the battery system to reveal whether the issue may be caused during the charging cycle, discharging cycle, or both. The diagnostic tests may include impedance testing that may identify resistance issues in the battery system. The diagnostic tests may include voltage testing using a voltmeter. The voltage may be measured from the battery system after a charge and may highlight poor performance from individual cells when a load may be applied to the battery system. The results from the diagnostic tests may be compared and evaluated together to provide a more complete picture of the circuit issue(s) identified.

Based on the operational status and a state of charge of the battery system, strategies for engine shutdown may be modified. In one example, responsive to the operational status of the battery system being calculated or determined to be degraded, the controller may direct the battery system to be fully charged before shutdown. This may allow for the maximum capacity of the battery system to be used, despite a degraded state. In another example, the controller may indicate that based on the operational status of the battery system being calculated or determined to be degraded, the battery system may need to be repaired or replaced. This may involve the controller directing the vehicle to travel to a service station in order for the battery system to be replaced.

Another responsive action to a degraded operational status of the battery system may be for the controller or processor to estimate the essential loads needed during a given trip, such as engine cranking, communication, etc. The controller or processor may then only allocate essential loads from the battery system during the given trip. This may prevent non-essential loads during the trip to preserve battery capacity. One response to a degraded operational status of the battery system may be to have the vehicle travel to a station or area with other vehicles. This may allow for the degraded battery system to be jumpstarted by another vehicle. In the event a dead battery system may be identified, a strategy may be provided for jump starting a vehicle system using another vehicle travelling in the vehicle system. For example, a second energy storage system may be in the vehicle system. Responsive to the operational status of the battery system falling below the predetermined threshold, the second energy storage system may jump start the battery system. In one example, the battery system and the second energy storage system may be onboard the same vehicle, however, the battery system and the second energy storage system may be onboard different vehicles or one or both of the battery system and the second energy storage systems may be offboard the vehicle.

A system may be used to prevent the AESS based on the battery having a degraded operational status. The system may be controllable such that the feature to prevent or allow AESS based on the operational status of the battery may be turned on or off. The battery may be determined to be degraded based on a measured impedance of the battery being above a predetermined threshold. When the impedance of the battery may be above the predetermined threshold, the charging time for the battery may be extended to ensure that a predetermined number of Amp Hours may be input into the battery. Once the extra charging has occurred, the impedance may be measured during a subsequent crank of the engine. If the impedance may be below the predetermined threshold, the system may operate under normal conditions with the assumption that the operational status of the battery is operational. If the impedance exceeds the predetermined threshold during the subsequent crank, the system may disable AESS shutdown for a fixed amount of time.

In one example, the fixed amount of time may be between 1 hour and 14 days. Once the AESS shutdown has been disabled, the system may send a message at periodic or repeated intervals. The message may indicate a creation of a battery service request in the event the battery may need repair or replacement. The message may track the duration the AESS shutdown may be disabled. If the AESS shutdown exceeds the fixed amount of time, the system may reenable AESS shutdown to reevaluate the system. The system may reenable AESS shutdown to mitigate the loss of engine shutdown opportunities to the system. The system may reenable AESS to confirm whether the operational status of the battery may not be conducive to using the AESS shutdown and may require other action. The system may reenable AESS shutdown to avoid continuing any mitigations (e.g., not using the AESS shutdown) based on stale data. Said another way, if a degraded battery was detected more than a week ago, the system may reenable AESS shutdown may allow the system to get more current data about the operational status of the battery.

Figure 3:
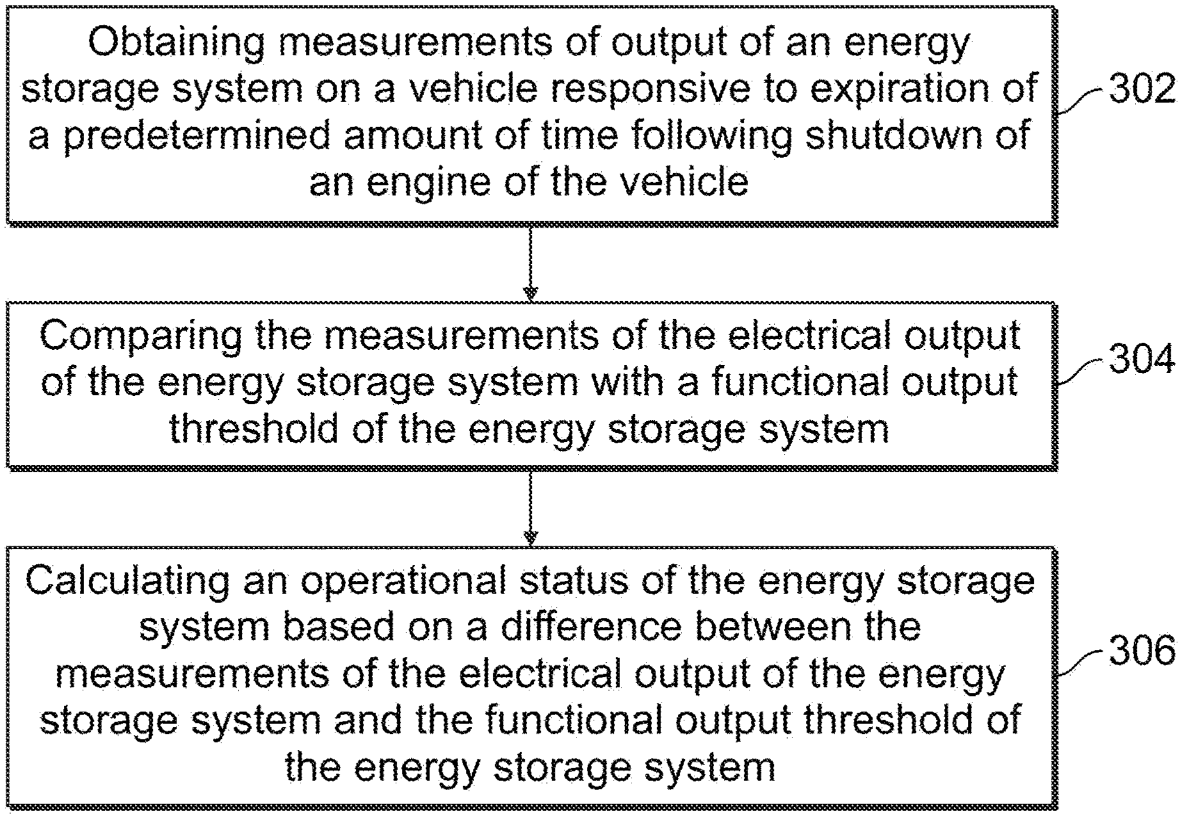
FIG. 3 shows a method of managing an energy storage system, according to one example.

FIG. 3 illustrates a flowchart of one example of a method 300 for managing an energy storage system. The method may include calculating an operational status of the energy storage system. The method may represent operations performed by the controller of the vehicle, such as the controller 104 shown in FIG. 1. The energy storage system may be a battery assembly, a capacitor, a fuel cell, or the like.

At step 302, an output of the energy storage system to the vehicle may be measured following the shutdown of the engine of the vehicle. The output may be a voltage or a current from the energy storage system and may be measured by one or more sensors. The output may be measured after a predetermined amount of time following shutdown. The predetermined amount of time may ensure that the energy storage system may have time to come to an equilibrium or settling point. The predetermined time may be between 15 seconds and 10 minutes, in one example. The output of the energy storage system may be measured using a voltmeter, a multimeter, by connecting the energy storage system to a load resistor to calculate a voltage drop, measuring an internal resistance of the energy storage system, or the like.

At step 304, the measured output may be compared with a functional output threshold of the energy storage system. The functional output threshold may be determined empirically or theoretically. The functional output threshold may be the expected output in a fully functioning or healthy energy storage system. The functional output threshold may be a baseline output expected from the energy storage system in a fully operational state. At step 306, the operational status of the energy storage system may be calculated based on the difference between the measured output and the functional output threshold of the energy storage system. If the difference between the measured output and the functional output threshold may be below a predetermined value, this may indicate the energy storage system is in a fully operational status and may be performing as expected. If the difference between the measured output and the functional output threshold may be above a predetermined value, the may indicate the energy storage system may be in a degraded state, as the energy storage system's measured output may be less or significantly less than the functional output threshold. Based on the determined operational status of the energy storage system, the method may further include providing a notification when the output or operational status may be below a predetermined threshold, for example in a degraded state.

As part of evaluating and improving the operational status of the energy storage system, the controller may avoid improper shutdown of the vehicle and energy storage system. To prevent improper shutdown because of potential operator negligence, an additional switch may be provided to differentiate between an emergency operation switch and a non-emergency operation switch, as discussed below.

Figure 4:
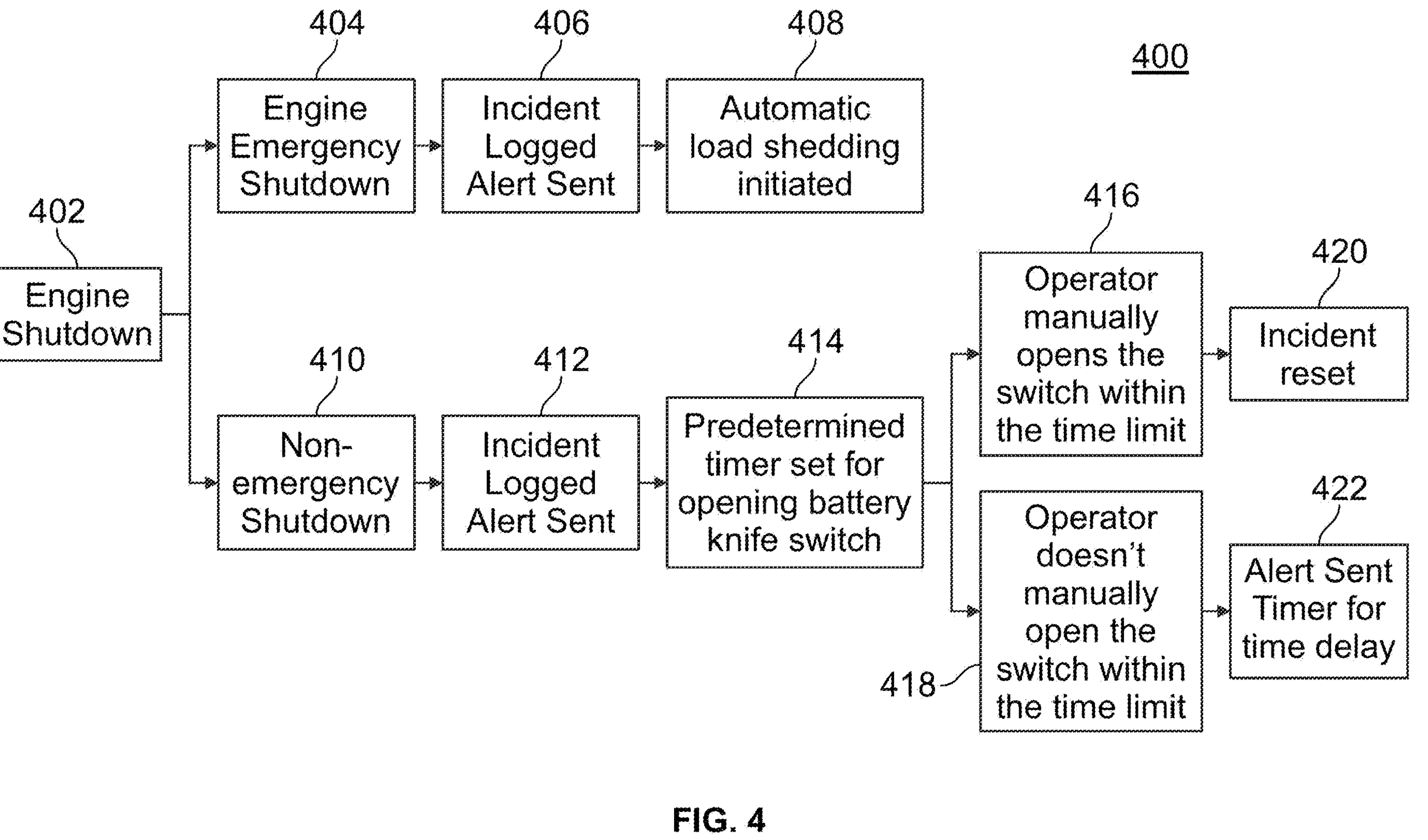
FIG. 4 shows a method of evaluating an energy storage system, according to one example.

FIG. 4 illustrates a method 400 for evaluating an energy storage system, according to one example. The method may include evaluating an improper vehicle shutdown. An improper vehicle shutdown may be due to an operator error, for example, not disconnecting all loads from the energy storage system. If the vehicle may be shutdown with a load still connected to the energy storage system, the energy storage system may be drained (e.g., lose voltage/capacity) and may be unable to provide sufficient power on a subsequent trip. For example, the energy storage system may not be able to crank the engine on the subsequent trip.

At step 402, an engine shutdown may be registered where an energy storage system may still be connected to one or more loads. The method may identify whether the shutdown may be associated with a non-emergency switch shutdown (step 410) or an emergency switch shutdown (step 404). A non-emergency switch shutdown may be a shutdown of the vehicle that may occur in routine operation, such as a planned end to a given trip, whereas an emergency switch shutdown may occur when an error or other abnormality may be detected that may make a shutdown of the vehicle preferred. If the shutdown is associated with the emergency shutdown switch, an incident may be logged and an alert may be sent, as seen at step 406. The alert may be sent to an operator of the vehicle, to a controller of the vehicle, to the area surrounding the vehicle, to an offboard control system, or the like. The alert may indicate that the shutdown was improper and may result in a degradation of the energy storage system or a capacity of the energy storage system. The alert may indicate a responsive action to take, for example, disconnecting recommended loads or all loads from the energy storage system.

If no action is taken by the operator or controller after the alert, the method may proceed to step 408. At step 408, an engine stop sequence may be activated that may initiate shutdown of the control system and may disconnect any recommended, non-essential loads from the energy storage device. The non-essential loads may include onboard power devices, non-essential communication devices, lights, engine idling, or the like. Disconnecting the non-essential loads from the energy storage device may preserve the capacity of the energy storage device and may allow the energy storage device to have sufficient capacity for subsequent operation. Disconnecting the non-essential loads may be referred to as automatic load shedding, which is discussed more below and shown in FIG. 5.

As shown at step 410, the method may include identifying a non-emergency shutdown where a load may still be connected with the energy storage system. A non-emergency shutdown may be a shutdown of the vehicle that may occur in routine operation, such as a planned end to a given trip. In response to a non-emergency shutdown, an incident may be logged, and an alert may be sent, as shown at step 412. The alert may inform the control system, the operator, or the like that the vehicle system has been shutdown and a load may still be connected with the energy storage device.

At step 414, a predetermined timer may be set for opening a battery knife switch to disconnect the energy storage system. This timer may be set to provide a grace period for the operator to disconnect any remaining loads from the energy storage device. Once the timer is set, step 416 may occur if an operator manually opens the switch to disconnect the energy storage system before the predetermined timer expires. If the energy storage system may be disconnected before the timer expires, then the incident may be reset, as shown at step 420. Said another way, the operator may disconnect the remaining loads from the energy storage system after shutdown and the improper shutdown may be corrected by the operator without additional intervention.

If the operator does not manually open the switch within the predetermined time, a second alert may be sent, as shown at step 422. The second alert may be sent to multiple operators or may be made more urgent in sound or volume in order to draw attention to the issue. Alternatively, the second alert may automatically open the switch to disconnect the energy storage source. The second alert may automatically open the switch in response to the energy storage system reaching a predetermined threshold. This may prevent the energy storage system from falling below a threshold needed to restart the engine.

In one example, the location of the vehicle may be determined when a shutdown is registered. The location may be determined by navigation system or position system, for example a global navigation satellite system (GNSS) receiver such as a global positioning system (GPS), user input, or the like. The location of the vehicle may impact the calculation of the predetermined threshold of the energy storage system as well as the predetermined timer set for the second alert. In one example, the location reading during shutdown may be at a service shop, in which event, the energy storage system may be allowed to reach a lower threshold because the service shop may be able to more easily jump or recharge the energy storage system. The location reading may indicate that the energy storage device may be in proximity to another vehicle or another energy source that may be capable of charging or jumpstarting the energy storage device, in which event, the energy storage system may be allowed to reach the lower threshold. The location reading may indicate that the energy storage system may be isolated or removed from a service shop or another energy source capable of recharging or jumpstarting the energy storage device, in which event, the energy storage system may be allowed to reach a higher threshold to ensure that the energy storage system has sufficient capacity to crank the engine and provide the capacity to get the vehicle to the next service shop or energy source that may charge the energy storage device.

Figure 5:
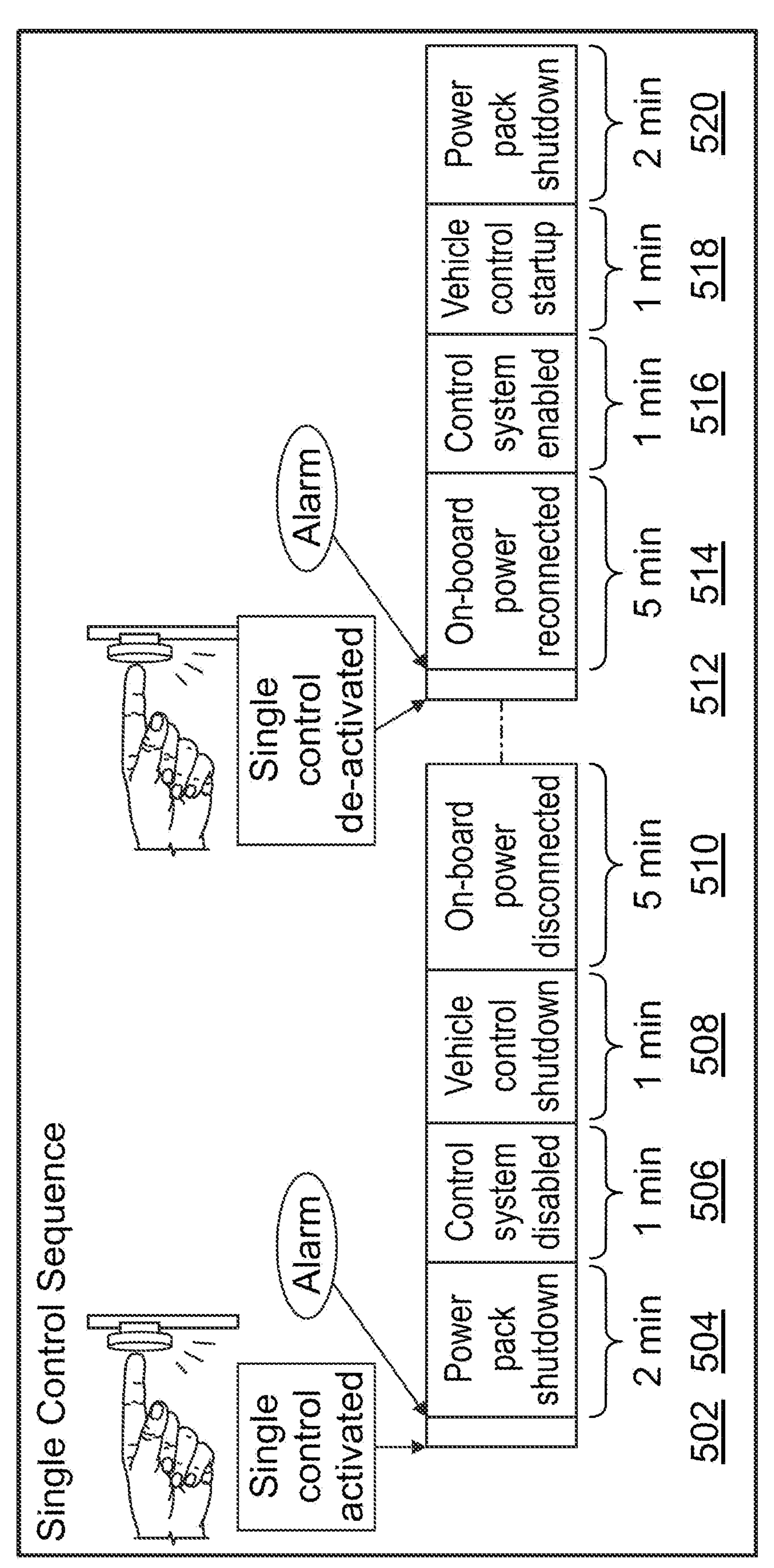
FIG. 5 shows a method for load shedding of an energy storage system, according to one example.

FIG. 5 illustrates a method for load shedding of an energy system, according to one example. When the emergency shutdown switch may be activated, automatic load shedding 500 may be initiated in order to protect and preserve the energy storage system. The automatic load shedding may progressively, sequentially, or selectively remove loads from the energy storage system. By removing the loads selectively, as opposed to removing all loads at once, the energy storage system may be able to ramp down and be protected from sudden drops in voltage. The first step may be the emergency shutdown switch being activated, as shown at step 502. The emergency shutdown switch may be activated when an error or other abnormality may be detected that may make a shutdown of the vehicle preferred. The error or abnormality may be detected by one or more sensors, an operator, a control system, or the like. The shutdown may allow the operator or control system to evaluate and diagnosis the error or abnormality.

In response to the activation, various systems may be sequentially shutdown to further load shed the energy storage system. While shown and described in order, the shutdown of the various systems may occur in a different order. Further, one or more systems may be shutdown simultaneously. At step 504, a power pack may shutdown. In one example, the power pack may be an energy source for powering propulsion of the vehicle or other loads of the vehicle. The shutdown of the power pack may disconnect the power pack from given loads of the vehicle. The given loads may be loads that operate to move the vehicle, however, the given loads may not include other loads, such as communication systems. This shutdown may take a predetermined amount of time. In one example, the amount of time is between 30 seconds and 5 minutes. The predetermined amount of time may ensure that the shutdown has sufficient time to occur effectively and efficiently without damaging the energy storage device or the vehicle.

At step 506, a control system may be disabled after a predetermined amount of time. The control system may be disabled by disconnecting the load from the energy storage system. The control system may be disabled after the power pack to ensure the vehicle may be stopped or stopping.

At step 508, a vehicle control shutdown may occur after a predetermined amount of time. Finally, at step 510, an onboard power may be disconnected totally from the energy storage device. One of the objectives of the method may be to gradually remove power consuming devices from the energy storage system in order to prevent the energy storage system from falling below a predetermined threshold. Although shown in the order listed above and in FIG. 5, in other examples, the order of the systems and components shutdown may be modified based on desired outcome and energy requirements.

At step 512, the emergency shutdown switch may be deactivated once the issues regarding the energy storage system may have been resolved or the vehicle may be in an adequate location to stop, such as a service shop. The emergency shutdown switch deactivation may work largely in the opposite direction of activation. While shown and described in order, the shutdown of the various systems may occur in a different order. Further, one or more systems may be shutdown simultaneously. At step 514, the onboard power may be reconnected after a determined amount of time. At step 516, the control system may be enabled. At step 518, the vehicle control may startup. Finally, at step 520, the power pack may startup. The gradual turning back on of the various systems at given time intervals may help to ensure that the energy storage system is functioning properly and has adequate capacity to power a given system before moving on to the next system.

Figure 6:
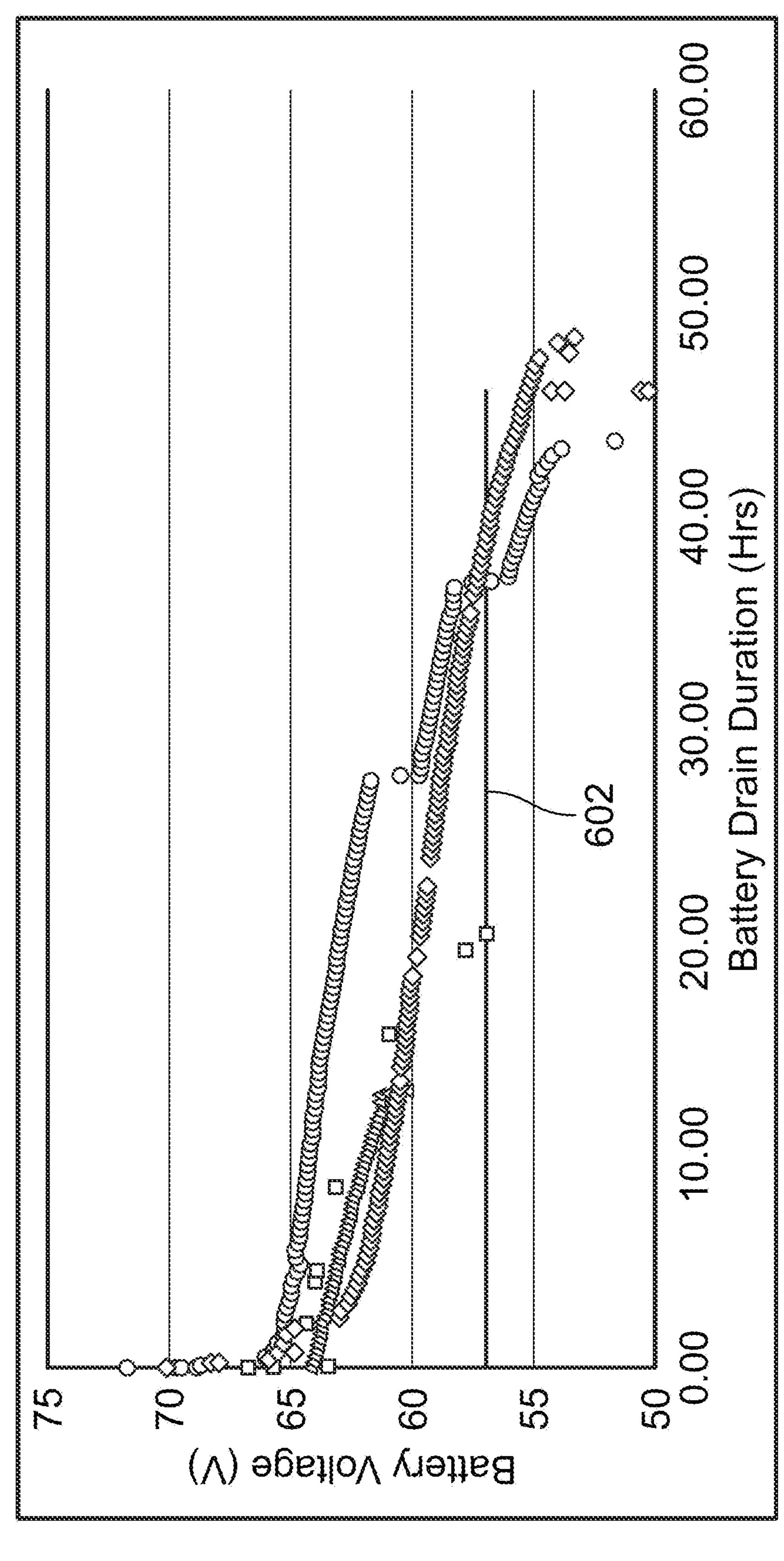
FIG. 6 shows a chart of a battery voltage versus a battery drain duration, according to one example.

FIG. 6 illustrates a graph 600 of battery voltage on the Y-axis and battery drain duration in hours on the X-axis, according to one example. The battery voltage may be of a battery powering a vehicle, as described above. The battery voltage typically needed to crank the engine may be between 55 and 65 volts, as illustrated by line 602. This may be referred to as a threshold voltage. The graph may track multiple batteries over time. As shown by graph in FIG. 6, the predetermined time period for a battery to drain below a the threshold voltage may typically be between 24 hours and 36 hours. However, this time period may change depending on the operational status, the state of charge, and other factors about the battery. The time period may also vary depending on the estimated voltage needed to start an engine of a given vehicle. The operational status of the energy storage system may be estimated during cranking events of the engine. Resistance of the battery may be calculated and charted during cranking events. The resistance may be measured during every cranking event or may be measured at fixed intervals, for example the resistance may be measured once every five cranking events. Further, the resistance may be measured at random or non-fixed intervals of cranking events. Generally, each cranking event over time may impact the life and/or the operational status of the battery. The charted resistance over time during cranking events may be used in tandem with battery temperature to predict the remaining life of the battery.

The internal resistance of the battery may be measured as equivalent series resistance (ESR). A threshold of ESR may be determined below which the battery may be likely to fail and/or the battery may be likely to be dead or non-functional. Typically, the threshold of failure may be 30 mOhms. ESR may be measured onboard and may also be measured at service shops or stations. The ESR measured at the service station may be used to verify and confirm the onboard reading. The reading at the service station may help calibrate for noise that may be present when ESR may be measured onboard.

Figure 7:
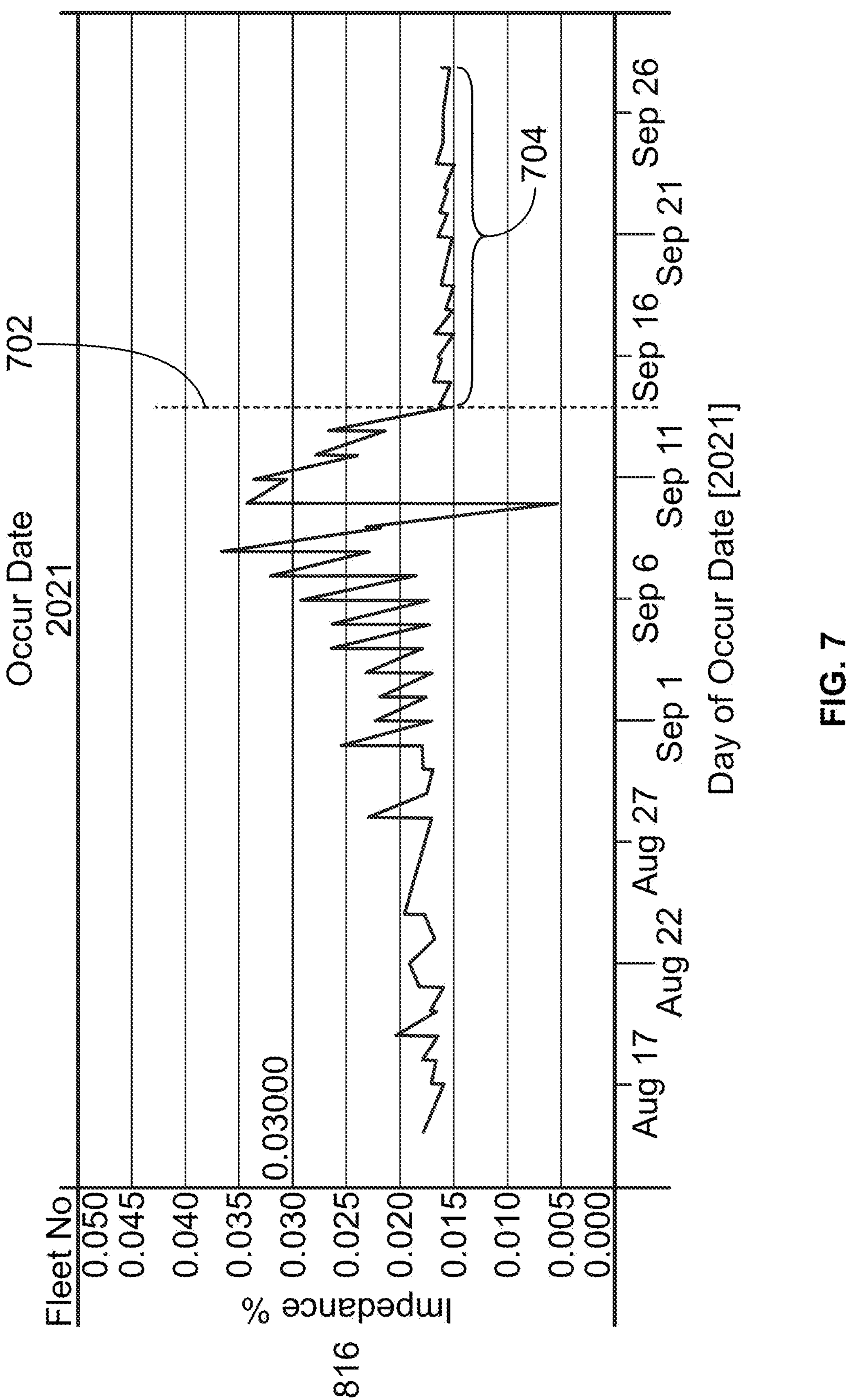
FIG. 7 shows a chart of a measured resistance during a cranking event of an energy storage system, according to one example.

FIG. 7 illustrates a chart of a measured resistance during a cranking event of an energy storage system, for example a battery, according to one example. As determined theoretically and empirically, as the battery becomes degraded, the standard deviation of the ESR or impedance may become higher, as illustrated in the graph shown in FIG. 7. Line 702 may indicate when the battery was changed. After the battery was changed, the reading may have less noise and may be quite flat, as illustrated by portion 704. Over time, after a certain number of crank or usage events, the noise may start trending upward and the standard deviation may become higher. This may indicate when another battery replacement may be beneficial. In one example, the battery may be slow charged or trickle charged to full capacity. The slow charge may allow an accurate ESR reading to be measured. Additionally, the slow charge may allow for an activation polarization and a concentration polarization to be measured. The activation polarization and concentration polarization may be indicative of reducing performance in the battery.

Figure 8:
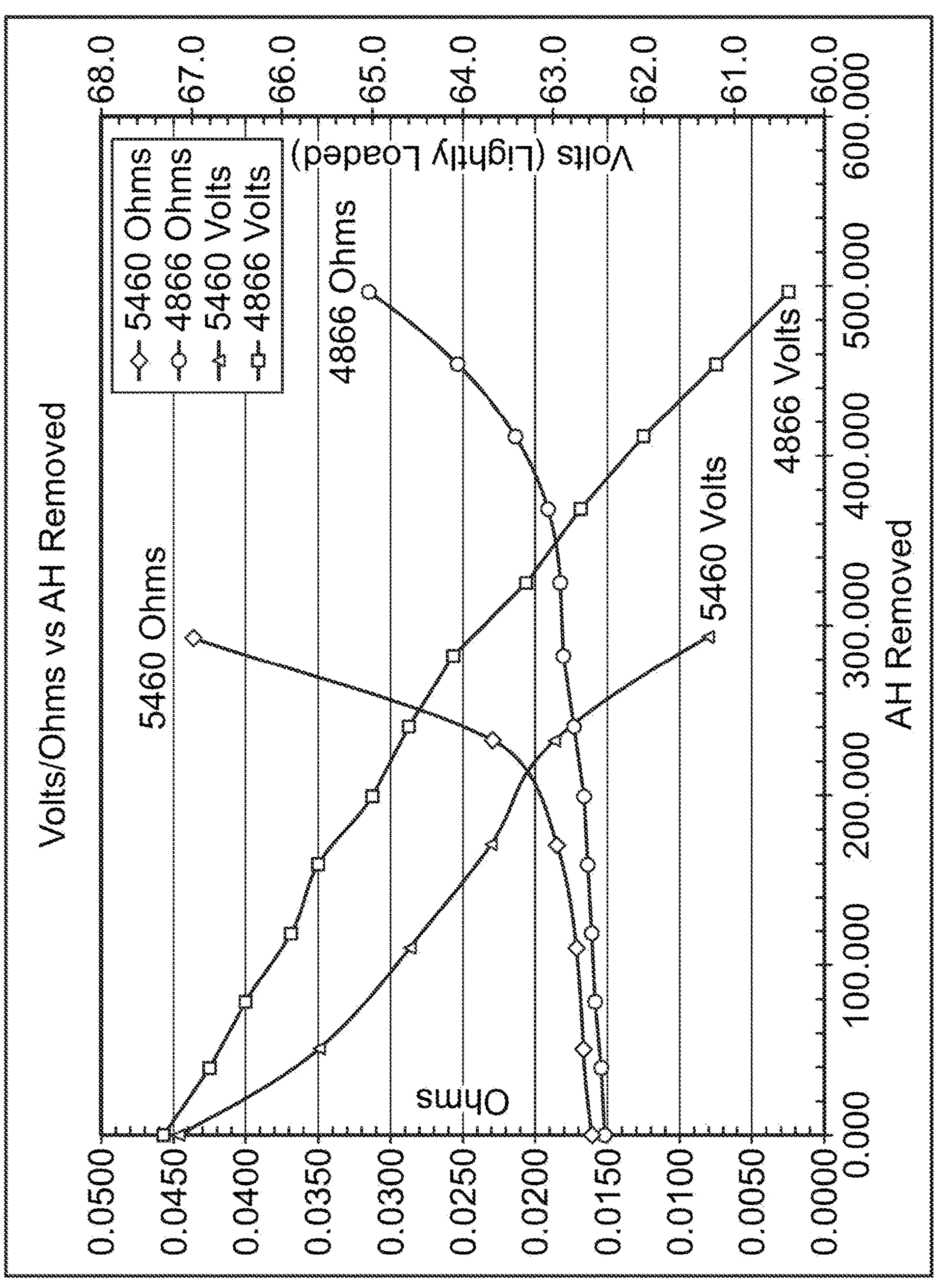
FIG. 8 shows a chart of voltage and current versus amp-hour removed, according to one example.

FIG. 8 shows a chart of voltage and current versus amp-hour removed, according to one example. In the example illustrated in FIG. 8, 5460 may be representative of a degraded battery and 4866 may be representative of a fully operational or healthy battery. In one example, the resistance of 5460 may increase faster when compared with the resistance of 4866. The increased resistance may make it more difficult to conduct current into the battery for charging. Additionally, the increased resistance may make it more difficult to conduct current out of the battery for powering loads. As the resistance increases, more current may be lost as a result of the increased resistance. Thus, where the resistance increases more steeply or quicker, this may be indicative of a degraded or less healthy battery. Onboard sensors may measure the present change in voltage and the present change in current and compare these to the threshold for a fully operational battery. If the change in voltage with respect to the change in current may be greater than the threshold, this may indicate that the operational status of the battery may be degraded or declining. When the change in voltage with respect to the change in current may be greater than the threshold, the onboard control system may provide a warning to an operator or a maintainer. This warning may allow repair or replacement of the battery before a failure event.

The onboard estimation of the operational status of the battery may be based on various characteristics of the battery. In one example, the characteristics may include the battery voltage, current, impedance, and the like. Specifically, the change in the battery voltage with respect to the change in the current may be determined. As illustrated in FIG. 8, a trend of the change in voltage and current versus the amp-hour lost may be shown. In one example, the voltage and current may be measured a predetermined time after an engine of a vehicle shuts off. This may allow the battery and engine to settle into a state of charge. The battery may have an artificially inflated voltage immediately after shutoff as the battery may still be receiving charge from the engine. The voltage may then dip and settle into a more accurate reflection of voltage after the predetermined time. In one example, the predetermined time may be between 5 minutes and 3 hours. More specifically, the predetermined time may be between 30 minutes and 1 hour. The trend of a fully operational battery may be used to determine a threshold for a fully battery. However, where voltage may drop more quickly, this may be indicative of the battery deteriorating.

Figure 9:
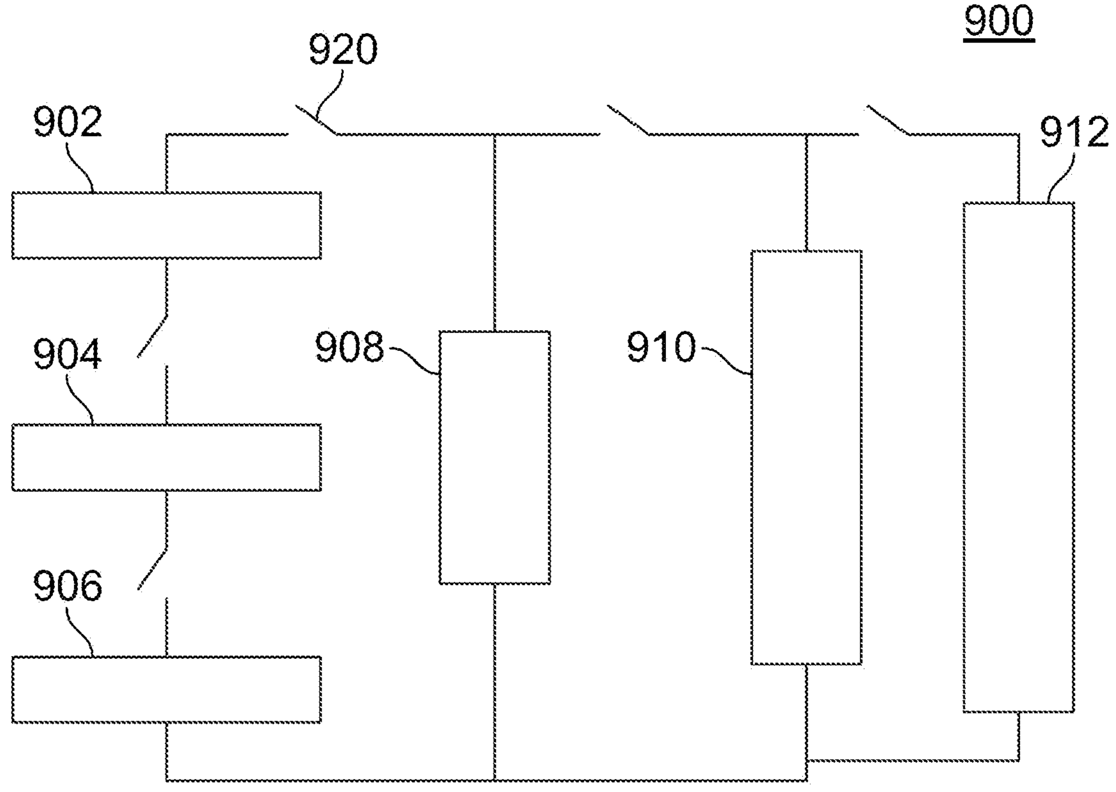
FIG. 9 shows an energy storage system, according to one example.

FIG. 9 illustrates an energy storage system 900, according to one example. The energy storage system may include multiple energy storage devices 902, 904, 906, 908, that may power essential loads 910 and non-essential loads 912. The energy storage devices may include batteries or battery banks, capacitors or ultracapacitors, fuel cells, or the like. The energy storage devices may provide different functions to power the essential and non-essential loads. For example, the capacitors may be used to power cranking or startup of the engine and the batteries may be used to power communication systems. The energy storage devices may be separated from each other by switches 920. The switches may be selectively opened or closed during operation. Each energy storage device may be evaluated to determine an operational status of the energy storage device, as described above. The evaluation may include measuring the ESR, current, voltage, temperature, or the like of the energy storage device. The switches may be opened during the evaluation to disconnect the energy storage devices from each other, to ensure an accurate measurement or evaluation of each energy storage device.

In one embodiment, a system is provided that may include one or more processors that may receive one or more signals relating to operation of an energy storage system of a vehicle. The one or more processors may calculate an operational status of the energy storage system based at least in part on comparing the one or more signals with one or more designated criteria related to the energy storage system. The one or more processors may automatically control a shutdown and a startup of an engine of the vehicle responsive to the operational status of the energy storage system being below a predetermined threshold.

In one example, the one or more signals may include a resistance in the energy storage system during one or more cranking events. The resistance may be measured by one or more sensors. The one or more processors may repeatedly receive resistances at different times from one or more sensors and the one or more processors may evaluate a trend of the resistances to calculate the operational status based at least in part on the trend of the resistances. In one example, the one or more processors may calculate one or more of a mean, minimum, maximum, or standard deviation of the resistance and may calculate the operational status based at least in part on the one or more of the mean, minimum, maximum, or standard deviation of the resistances.

The one or more processors may receive an input value of an impedance of the energy storage system and may calculate the operational status based at least in part on the input value of the impedance. In one example, the one or more processors may prevent an automatic engine start stop (AESS) of the vehicle responsive to the impedance of the energy storage system being above a predetermined threshold.

In one example, the one or more signals may include a voltage and a current in the energy storage system during a charging cycle or a discharging cycle and the one or more processors may calculate the operational status based at least in part on comparing the voltage and the current that is received with the one or more designated criteria.

In one example, the one or more signals may include a temperature of the energy storage system. The one or more processors may monitor a loss in storage capacity of the energy storage system and may determine whether a predetermined lower storage threshold is reached. The predetermined lower storage threshold may be determined based at least in part on a capacity of the energy storage system to start the engine of the vehicle.

The system may include a primary shut down switch that may connect one or more of the engine or the energy storage system to a control system to operate the vehicle responsive to the primary shut down switch being in a closed position and stop operation of the vehicle responsive to the primary shut down switch being in an open position.

The one or more processors may receive a temperature of the energy storage system and may calculate the operational status at least in part on comparing the temperature received with the one or more designated criteria. The one or more processors may prevent the startup of the engine responsive to the operational status of the energy storage system being less than a predetermined threshold.

In one example, the energy storage system may be a first energy storage system. The one or more processors may jump start the first energy storage system using a secondary energy storage system responsive to the operational status of the energy storage system being less than a predetermined threshold. In one example, the secondary energy storage system may be onboard the vehicle.

In one embodiment, a method is provided that may include obtaining measurements of electrical output of an energy storage system onboard a vehicle responsive to expiration of a predetermined amount time following shutdown of an engine of the vehicle. The method may include comparing the measurements of the electrical output of the energy storage system with a functional output threshold of the energy storage system. The method may further include calculating an operational status of the energy storage system based on a difference between the measurements of the electrical output of the energy storage system and the functional output threshold of the energy storage system.

In one example, obtaining the measurements may include obtaining one or both of a voltage drop out of the energy storage system or a current output by the energy storage system. Obtaining the measurements may include obtaining an internal resistance of the energy storage system.

In one example, calculating the operational status of the energy storage system may be performed by one or more processors disposed onboard the vehicle. The method may include providing a notification responsive to the difference between the measurements of the electrical output of the energy storage and a predetermined output of the energy storage system being greater than a predetermined threshold.

In one embodiment, a system is provided that may include one or more processors that may receive one or more signals relating to an electrical output of an energy storage system onboard a vehicle. The one or more signals may be received responsive to expiration of a predetermined amount of time following a shutdown of an engine of the vehicle. The one or more processors may compare the electrical output of the energy storage system with a functional output threshold of the energy storage system. The one or more processors may automatically control the shutdown and a startup of the engine of the vehicle responsive to the one or more signals meeting one or more designated criteria relative to the functional output threshold of the energy storage system. The one or more processors may calculate an operational status of the energy storage system of the vehicle based at least in part on the one or more signals. The one or more designated criteria for the control of the shutdown and the startup of the engine may be related to the operational status that may be calculated.

In one example, the one or more signals relating to the electrical output of the energy system may include a measurement of an internal resistance of the energy storage system.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

What is claimed is:

1. A method comprising:

obtaining measurements of electrical output of an energy storage system onboard a vehicle responsive to expiration of a predetermined amount time following a shutdown of an engine of the vehicle;

calculating an operational status of the energy storage system based on a comparison of the measurements of the electrical output of the energy storage system and one or more designated criteria; and responsive to the operational status being below an operational threshold, preventing a subsequent shutdown of the engine of the vehicle until acknowledgment of the operational status is received from an operator of the vehicle.

2. The method of claim 1, wherein obtaining the measurements includes obtaining one or more of a voltage drop out of the energy storage system, a current output by the energy storage system, or an internal resistance of the energy storage system.

3. The method of claim 2, further comprising calculating a standard deviation of one or more of the voltage drop, the current output, or the internal resistance and calculating the operational status based at least in part on the standard deviation of the one or more of the voltage drop, the current output, or the internal resistance.

4. The method of claim 1, wherein calculating the operational status of the energy storage system is performed by one or more processors disposed onboard the vehicle.

5. The method of claim 1, further comprising providing a notification of the operational status to the operator of the vehicle.

6. The method of claim 1, further comprising preventing an automatic engine start stop (AESS) of the vehicle responsive to the operational status being below the operational threshold.

7. The method of claim 1, wherein the operational threshold is based at least in part on a capacity of the energy storage system required to start the engine of the vehicle.

8. The method of claim 1, further comprising requesting inspection or repair of the energy storage system responsive to the operational status being below the operational threshold.

9. The method of claim 1, further comprising charging the energy storage system during a subsequent operation of the engine responsive to the operational status being below the operational threshold.

10. A system comprising:

one or more processors configured to receive one or more signals relating to an electrical output of an energy storage system onboard a vehicle, the one or more signals received responsive to expiration of a predetermined amount of time following a shutdown of an engine of the vehicle, the one or more processors configured to calculate an operational status of the energy storage system of the vehicle based at least in part on a comparison of the electrical output of the energy storage system and one or more designated criteria; and the one or more processors configured to, responsive to the operational status being below an operational threshold, prevent a subsequent shutdown of the engine of the vehicle until acknowledgement of the operational status is received from an operator of the vehicle.

11. The system of claim 10, wherein the one or more signals relating to the electrical output of the energy storage system include a measurement of an internal resistance of the energy storage system.

12. The system of claim 10, wherein the one or more processors are configured to prevent an automatic engine start stop (AESS) of the vehicle responsive to the operational status being below the operational threshold.

13. The system of claim 10, wherein the operational threshold is based at least in part on a capacity of the energy storage system required to start the engine of the vehicle.

14. The system of claim 10, wherein the one or more processors are configured to request inspection or repair of the energy storage system responsive to the operational status being below the operational threshold.

15. The system of claim 10, wherein the one or more processors are configured to charge the energy storage system during a subsequent operation of the engine responsive to the operational status being below the operational threshold.

16. The system of claim 10, wherein the one or more processors are configured to provide a notification of the operational status to the operator of the vehicle.

* * * * *